(12) United States Patent
Larsson et al.

(10) Patent No.: US 9,716,571 B2
(45) Date of Patent: *Jul. 25, 2017

(54) METHOD AND APPARATUS FOR HYBRID AUTOMATIC REPEAT REQUEST SIGNALING

(71) Applicant: Telefonaktiebolaget L M Ericsson (publ), Stockholm (SE)

(72) Inventors: Daniel Larsson, Vallentuna (SE);
Jung-Fu Cheng, Fremont, CA (US);
Erik Eriksson, Linköping (SE);
Mattias Frenne, Uppsala (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 117 days.

This patent is subject to a terminal disclaimer.

(21) Appl. No.: 14/823,238

(22) Filed: Aug. 11, 2015

(65) Prior Publication Data

US 2016/0105263 A1    Apr. 14, 2016

Related U.S. Application Data

(63) Continuation of application No. 13/979,307, filed as application No. PCT/SE2013/000066 on May 8, 2013, now Pat. No. 9,137,787.

(Continued)

(51) Int. Cl.
*H04L 1/16* (2006.01)
*H04L 1/18* (2006.01)
(Continued)

(52) U.S. Cl.
CPC .......... *H04L 1/1864* (2013.01); *H04L 1/1607* (2013.01); *H04W 72/0406* (2013.01); *H04L 1/0008* (2013.01)

(58) Field of Classification Search
None
See application file for complete search history.

(56) References Cited

U.S. PATENT DOCUMENTS

2007/0189282 A1   8/2007   Lohr et al.
2008/0043619 A1   2/2008   Sammour et al.
(Continued)

FOREIGN PATENT DOCUMENTS

WO    2012113214 A1    8/2012
WO    2012145922 A1    11/2012
(Continued)

OTHER PUBLICATIONS

3GPP, "3rd Generation Partnership Project; Technical Specification Group Radio Access Network; Evolved Universal Terrestrial Radio Access (E-UTRA); Physical Layer Procedures (Release 10)", 3GPP TS 36.213 V 10.8.0, Dec. 2012, 1-126.

*Primary Examiner* — Jeffrey M Rutkowski
*Assistant Examiner* — Jonathan B Wood
(74) *Attorney, Agent, or Firm* — Murphy, Bilak & Homiller, PLLC

(57) ABSTRACT

In one aspect, the teachings herein provide a method and apparatus for extending certain HARQ feedback procedures introduced in LTE Rel-10, which were defined for CA configurations involving TDD serving cells of the same UL/DL configuration, to the new, more complex CA configurations introduced in Rel-11, which involve the aggregation of interband TDD serving cells with differing UL/DL configurations. Such reuse enables reliant and efficient HARQ feedback signaling in LTE Rel-11, without substantially increasing the specification or implementation complexity of HARQ feedback signaling in LTE Rel-11, despite the decidedly more complex CA configurations introduced in LTE Rel-11.

19 Claims, 15 Drawing Sheets

Related U.S. Application Data

(60) Provisional application No. 61/645,397, filed on May 10, 2012.

(51) Int. Cl.
  *H04W 72/04* (2009.01)
  *H04L 1/00* (2006.01)

(56) References Cited

U.S. PATENT DOCUMENTS

| | | |
|---|---|---|
| 2008/0227442 A1 | 9/2008 | Pani et al. |
| 2010/0118811 A1 | 5/2010 | Lee et al. |
| 2011/0085513 A1 | 4/2011 | Chen et al. |
| 2011/0103286 A1 | 5/2011 | Montojo et al. |
| 2011/0228731 A1 | 9/2011 | Luo et al. |
| 2011/0268001 A1 | 11/2011 | Lee et al. |
| 2012/0087254 A1 | 4/2012 | Yin et al. |
| 2012/0106408 A1 | 5/2012 | Papasakellariou et al. |
| 2012/0147815 A1 | 6/2012 | Meyer et al. |
| 2012/0150654 A1 | 6/2012 | Sathyanath et al. |
| 2012/0257513 A1 | 10/2012 | Yamada |
| 2013/0021898 A1 | 1/2013 | Kang et al. |
| 2013/0114575 A1 | 5/2013 | Fu et al. |
| 2013/0155915 A1 | 6/2013 | Park et al. |
| 2013/0201884 A1 | 8/2013 | Freda et al. |
| 2013/0223296 A1 | 8/2013 | Zeng et al. |
| 2013/0242824 A1 | 9/2013 | Lee et al. |
| 2013/0242890 A1 | 9/2013 | He et al. |
| 2013/0322307 A1 | 12/2013 | Yang et al. |
| 2013/0322397 A1 | 12/2013 | Lee et al. |
| 2014/0092824 A1 | 4/2014 | He et al. |
| 2014/0161001 A1 | 6/2014 | Gao et al. |
| 2014/0219234 A1 | 8/2014 | Kim et al. |
| 2014/0334395 A1 | 11/2014 | Han et al. |
| 2014/0376421 A1 | 12/2014 | Seo et al. |
| 2015/0016371 A1 | 1/2015 | Lee et al. |
| 2015/0036603 A1 | 2/2015 | Seo et al. |
| 2015/0043462 A1 | 2/2015 | Kim et al. |
| 2015/0063179 A1 | 3/2015 | Seo et al. |

FOREIGN PATENT DOCUMENTS

| | | |
|---|---|---|
| WO | 2013025143 A1 | 2/2013 |
| WO | 2013025150 A1 | 2/2013 |
| WO | 2013168974 A1 | 11/2013 |

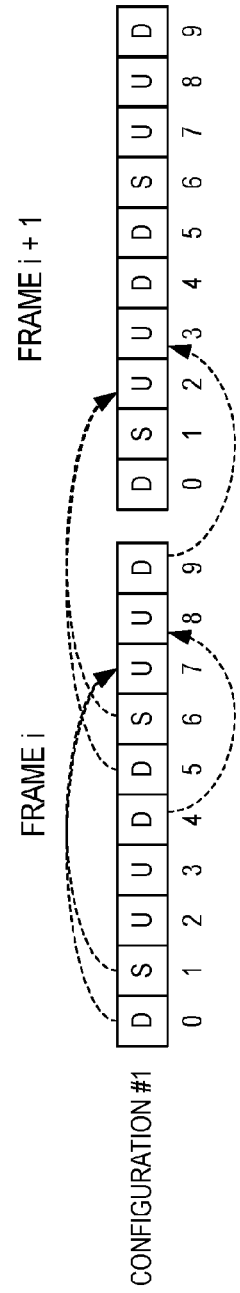
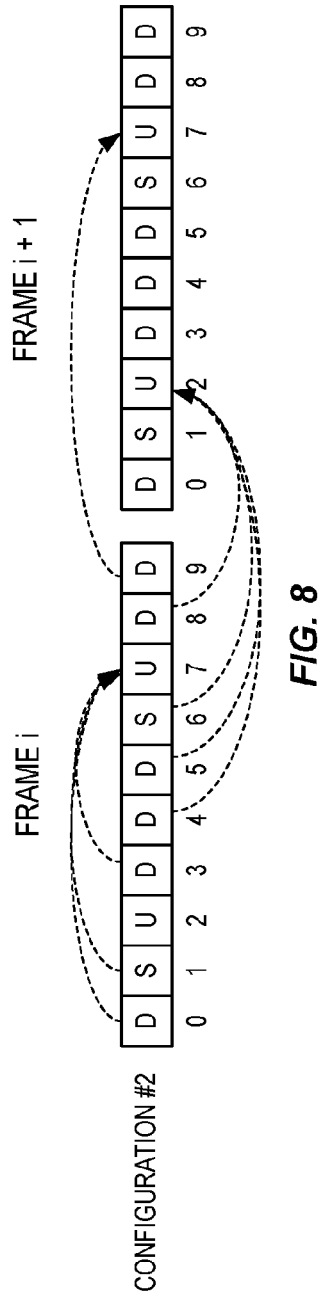
FIG. 6  FIG. 7  FIG. 8

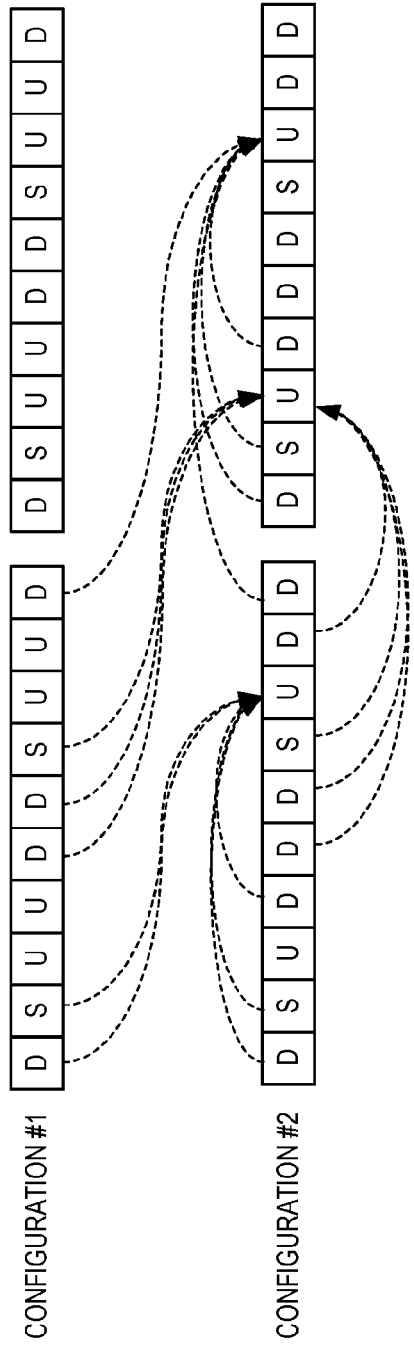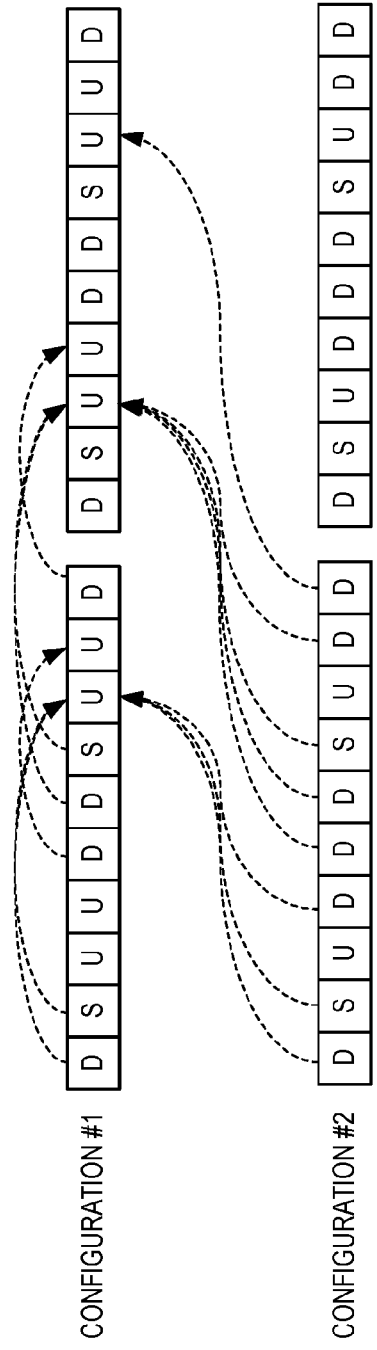
FIG. 9
FIG. 10

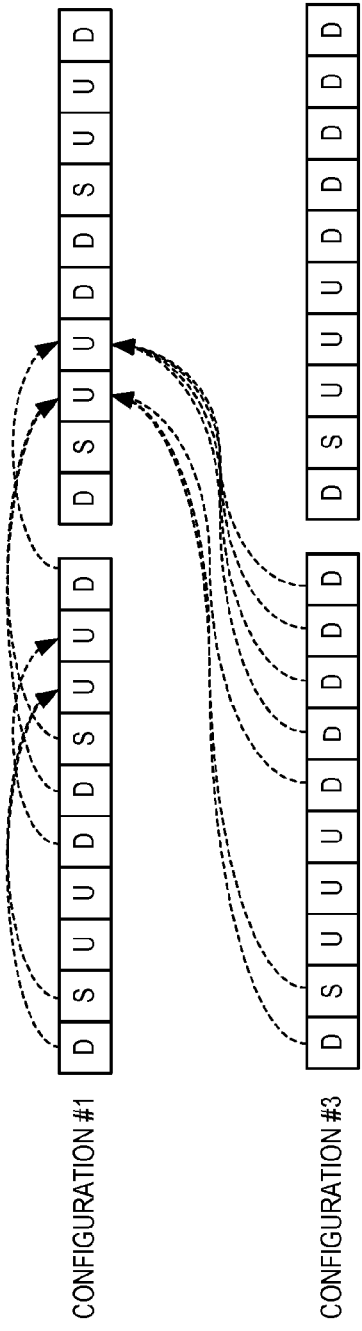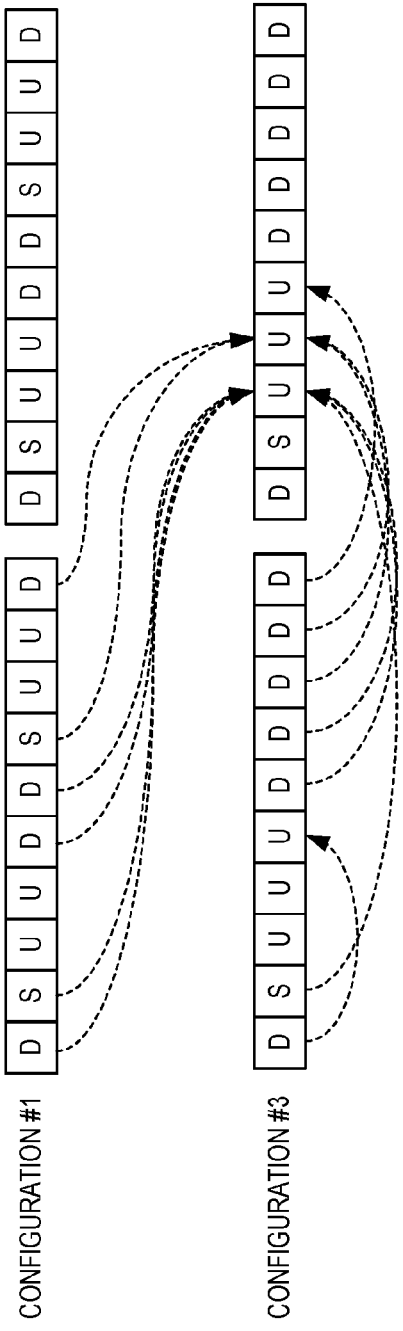

TABLE 2

| $M_{PCell}$ | $M_{SCell}$ | CLASSIFICATION |
|---|---|---|
| 1 | 1 | Rel-10 cases |
| 2 | 2 | |
| 3 | 3 | |
| 4 | 4 | |
| 1 | 2 | New case group 1 |
| 2 | 1 | |
| 1 | 3 | New case group 2 |
| 3 | 1 | |
| 1 | 4 | New case group 3 |
| 4 | 1 | |
| 2 | 3 | |
| 3 | 2 | |
| 2 | 4 | |
| 4 | 2 | New case group 3 (cont.) |
| 3 | 4 | |
| 4 | 3 | |
| 1 | 0 | New case group 4 |
| 2 | 0 | |
| 3 | 0 | |
| 4 | 0 | |
| 0 | 1 | |
| 0 | 2 | |
| 0 | 3 | |
| 0 | 4 | |

*FIG. 15*

TABLE 3

| A | HARQ-ACK(j) | | | |
|---|---|---|---|---|
| | HARQ-ACK (0) | HARQ-ACK (1) | HARQ-ACK (2) | HARQ-ACK (3) |
| 2 | TB1 Primary cell | TB1 Secondary cell | NA | NA |
| 3 | TB1 Serving cell1 | TB2 Serving cell1 | TB1 Serving cell2 | NA |
| 4 | TB1 Primary cell | TB2 Primary cell | TB1 Secondary cell | TB2 Secondary cell |

*FIG. 16*

TABLE 4

| HARQ-ACK (0), HARQ-ACK (1) | $n^{(1)}_{PUCCH}$ | b(0),b(1) |
|---|---|---|
| ACK, ACK | $n^{(1)}_{PUCCH,1}$ | 1, 0 |
| ACK, NACK/DTX | $n^{(1)}_{PUCCH,0}$ | 1, 1 |
| NACK/DTX, ACK | $n^{(1)}_{PUCCH,1}$ | 0, 1 |
| NACK, NACK/DTX | $n^{(1)}_{PUCCH,0}$ | 0, 0 |
| DTX, NACK/DTX | NO TRANSMISSION | |

*FIG. 17*

TABLE 5

| HARQ-ACK (0), HARQ-ACK (1), HARQ-ACK (2) | $n^{(1)}_{PUCCH}$ | b(0),b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 0 |
| ACK, NACK/DTX, ACK | $n^{(1)}_{PUCCH,2}$ | 1, 0 |
| ACK, NACK/DTX, NACK/DTX | $n^{(1)}_{PUCCH,0}$ | 1, 1 |
| NACK/DTX, ACK, ACK | $n^{(1)}_{PUCCH,2}$ | 0, 1 |
| NACK/DTX, ACK, NACK/DTX | $n^{(1)}_{PUCCH,1}$ | 0, 1 |
| NACK/DTX, NACK/DTX, ACK | $n^{(1)}_{PUCCH,2}$ | 0, 0 |
| NACK, NACK/DTX, NACK/DTX | $n^{(1)}_{PUCCH,0}$ | 0, 0 |
| DTX, NACK/DTX, NACK/DTX | NO TRANSMISSION | |

*FIG. 18*

TABLE 6

| HARQ-ACK (0), HARQ-ACK (1), HARQ-ACK (2), HARQ-ACK (3) | $n^{(1)}_{PUCCH}$ | b(0),b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,2}$ | 1, 1 |
| ACK, ACK, NACK/DTX, ACK | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 1, 1 |
| ACK, NACK/DTX, ACK, NACK/DTX | $n^{(1)}_{PUCCH,2}$ | 1, 0 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,1}$ | 0, 0 |
| NACK/DTX, ACK, ACK, NACK/DTX | $n^{(1)}_{PUCCH,2}$ | 0, 1 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| NACK, NACK/DTX, NACK/DTX, NACK/DTX | $n^{(1)}_{PUCCH,0}$ | 0, 0 |
| DTX, NACK/DTX, NACK/DTX, NACK/DTX | NO TRANSMISSION | |

*FIG. 19*

TABLE 7

| A | HARQ-ACK(j) | | | |
|---|---|---|---|---|
| | HARQ-ACK (0) | HARQ-ACK (1) | HARQ-ACK (2) | HARQ-ACK (3) |
| 4 | The first subframe of Primary cell | The second subframe of Primary cell | The first subframe of Secondary cell | The second subframe of Secondary cell |

*FIG. 20*

TABLE 8

| Primary Cell | Secondary Cell | Resource | Constellation | RM Code Input Bits |
|---|---|---|---|---|
| HARQ-ACK (0), HARQ-ACK (1), HARQ-ACK (2) | HARQ-ACK (0), HARQ-ACK (1), HARQ-ACK (2) | $n_{PUCCH}^{(1)}$ | $b(0), b(1)$ | $o(0), o(1), o(2), o(3)$ |
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | NO TRANSMISSION | | 0, 0, 0, 0 |

*FIG. 21*

TABLE 9

| Primary Cell<br>HARQ-ACK (0), HARQ-ACK (1), HARQ-ACK (2), HARQ-ACK (3) | Secondary Cell<br>HARQ-ACK (0), HARQ-ACK (1), HARQ-ACK (2), HARQ-ACK (3) | Resource<br>$n^{(1)}_{PUCCH}$ | Constellation<br>$b(0), b(1)$ | RM Code Input Bits<br>$o(0), o(1), o(2), o(3)$ |
|---|---|---|---|---|
| ACK, ACK, ACK, NACK/DTX | ACK, ACK, ACK, NACK/DTX | $n^{(1)}_{PUCCH,1}$ | 1, 1 | 1, 1, 1, 1 |
| ACK, ACK, NACK/DTX, any | ACK, ACK, ACK, NACK/DTX | $n^{(1)}_{PUCCH,1}$ | 0, 0 | 1, 0, 1, 1 |
| ACK, DTX, DTX, DTX | ACK, ACK, ACK, NACK/DTX | $n^{(1)}_{PUCCH,3}$ | 1, 1 | 0, 1, 1, 1 |
| ACK, ACK, ACK, ACK | ACK, ACK, ACK, NACK/DTX | $n^{(1)}_{PUCCH,3}$ | 1, 1 | 0, 1, 1, 1 |
| NACK/DTX, any, any, any | ACK, ACK, ACK, NACK/DTX | $n^{(1)}_{PUCCH,3}$ | 0, 1 | 0, 0, 1, 1 |
| (ACK, NACK/DTX, any, any) except for (ACK, DTX, DTX, DTX) | ACK, ACK, ACK, NACK/DTX | $n^{(1)}_{PUCCH,3}$ | 0, 1 | 0, 0, 1, 1 |
| ACK, ACK, ACK, NACK/DTX | ACK, ACK, NACK/DTX, any | $n^{(1)}_{PUCCH,0}$ | 1, 0 | 1, 1, 1, 0 |
| ACK, ACK, NACK/DTX, any | ACK, ACK, NACK/DTX, any | $n^{(1)}_{PUCCH,3}$ | 1, 0 | 1, 0, 1, 0 |
| ACK, DTX, DTX, DTX | ACK, ACK, NACK/DTX, any | $n^{(1)}_{PUCCH,0}$ | 0, 1 | 0, 1, 1, 0 |
| ACK, ACK, ACK, ACK | ACK, ACK, NACK/DTX, any | $n^{(1)}_{PUCCH,0}$ | 0, 1 | 0, 1, 1, 0 |
| NACK/DTX, any, any, any | ACK, ACK, NACK/DTX, any | $n^{(1)}_{PUCCH,3}$ | 0, 0 | 0, 0, 1, 0 |
| (ACK, NACK/DTX, any, any) except for (ACK, DTX, DTX, DTX) | ACK, ACK, NACK/DTX, any | $n^{(1)}_{PUCCH,3}$ | 0, 0 | 0, 0, 1, 0 |
| ACK, ACK, ACK, NACK/DTX | ACK, DTX, DTX, DTX | $n^{(1)}_{PUCCH,2}$ | 1, 1 | 1, 1, 0, 1 |
| ACK, ACK, ACK, NACK/DTX | ACK, ACK, ACK, ACK | $n^{(1)}_{PUCCH,2}$ | 1, 1 | 1, 1, 0, 1 |
| ACK, ACK, NACK/DTX, any | ACK, DTX, DTX, DTX | $n^{(1)}_{PUCCH,2}$ | 0, 1 | 1, 0, 0, 1 |
| ACK, ACK, NACK/DTX, any | ACK, ACK, ACK, ACK | $n^{(1)}_{PUCCH,2}$ | 0, 1 | 1, 0, 0, 1 |
| ACK, DTX, DTX, DTX | ACK, DTX, DTX, DTX | $n^{(1)}_{PUCCH,2}$ | 1, 0 | 0, 1, 0, 1 |
| ACK, DTX, DTX, DTX | ACK, ACK, ACK, ACK | $n^{(1)}_{PUCCH,2}$ | 1, 0 | 0, 1, 0, 1 |
| ACK, ACK, ACK, ACK | ACK, DTX, DTX, DTX | $n^{(1)}_{PUCCH,2}$ | 1, 0 | 0, 1, 0, 1 |
| ACK, ACK, ACK, ACK | ACK, ACK, ACK, ACK | $n^{(1)}_{PUCCH,2}$ | 1, 0 | 0, 1, 0, 1 |
| NACK/DTX, any, any, any | ACK, DTX, DTX, DTX | $n^{(1)}_{PUCCH,2}$ | 0, 0 | 0, 0, 0, 1 |
| NACK/DTX, any, any, any | ACK, ACK, ACK, ACK | $n^{(1)}_{PUCCH,2}$ | 0, 0 | 0, 0, 0, 1 |
| (ACK, NACK/DTX, any, any), except for (ACK, DTX, DTX, DTX) | ACK, DTX, DTX, DTX | $n^{(1)}_{PUCCH,2}$ | 0, 0 | 0, 0, 0, 1 |
| (ACK, NACK/DTX, any, any), except for (ACK, DTX, DTX, DTX) | ACK, ACK, ACK, ACK | $n^{(1)}_{PUCCH,2}$ | 0, 0 | 0, 0, 0, 1 |

*FIG. 22A*

TABLE 9 (CONTINUED)

| Primary Cell | Secondary Cell | Resource | Constellation | RM Code Input Bits |
|---|---|---|---|---|
| HARQ-ACK (0), HARQ-ACK (1), HARQ-ACK (2), HARQ-ACK (3) | HARQ-ACK (0), HARQ-ACK (1), HARQ-ACK (2), HARQ-ACK (3) | $n_{PUCCH}^{(1)}$ | $b(0), b(1)$ | $o(0), o(1), o(2), o(3)$ |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | NO TRANSMISSION | | 0, 0, 0, 0 |
| DTX, any, any, any | (ACK, NACK/DTX, any, any), except for (ACK, DTX, DTX, DTX) | NO TRANSMISSION | | 0, 0, 0, 0 |

*FIG. 22B*

METHOD AND APPARATUS FOR HYBRID AUTOMATIC REPEAT REQUEST SIGNALING

RELATED APPLICATIONS

This application is a continuation of U.S. patent application Ser. No. 13/979,307, filed 11 Jul. 2013, which is a national stage entry under 35 U.S.C. §371 of International Patent Application serial no. PCT/SE2013/000066, filed 8 May 2013, which claims priority to the U.S. provisional patent application filed on 10 May 2012 and identified by Application Ser. No. 61/645,397. The entire contents of each of the aforementioned applications are incorporated herein by reference.

TECHNICAL FIELD

The present invention relates to systems and methods for Hybrid Automatic Repeat reQuest, HARQ, feedback using Physical Uplink Control Channel, PUCCH, for interband Time Division Duplex, TDD, carrier aggregation with different Uplink/Downlink, UL/DL, configurations on different bands.

BACKGROUND

Carrier aggregation or CA is one of the new features recently developed by the members of the 3rd-Generation Partnership Project, 3GPP, for so-called Long Term Evolution, LTE, systems, and is standardized as part of LTE Release 10, referred to as "LTE Rel-10" or simply "Rel-10", which is also known as LTE-Advanced. Rel-8 is an earlier version of the LTE standards and it supports bandwidths up to 20 MHz. In contrast, LTE-Advanced supports bandwidths up to 100 MHz. The very high data rates contemplated for LTE-Advanced require an expansion of the transmission bandwidth.

However, to maintain backward compatibility with Rel-8 mobile terminals, the available spectrum in Rel-10 is divided into chunks called component carriers, or CCs, where each CC is Rel-8 compatible. CA enables bandwidth expansion beyond the limits of LTE Rel-8 systems by allowing mobile terminals to transmit data over an "aggregation" of multiple Rel-8 compatible CCs, which together can cover up to 100 MHz of spectrum. This approach to CA ensures compatibility with legacy, Rel-8 mobile terminals, while also ensuring efficient use of the wider carrier bandwidths supported in Rel-10 and beyond by making it possible for the legacy mobile terminals to be scheduled in all parts of the wideband LTE-Advanced carrier.

The number of aggregated CCs, as well as the bandwidth of the individual CCs, may be different for uplink, UL and downlink, DL, transmissions. The configuration of aggregated CCs is referred to as "symmetric" when the number of CCs in the UL is the same as in the DL. Thus, a CA configuration with different numbers of CCs aggregated in the UL versus the DL is referred to as an asymmetric configuration. Note, too, that the number of CCs configured for a geographic cell area may be different from the number of CCs seen by a given mobile terminal. A mobile terminal, for example, may support more downlink CCs than uplink CCs, even though the same number of uplink and downlink CCs may be offered by the network in a particular area.

LTE systems can operate in either Frequency-Division Duplex, FDD, mode or in TDD mode. In FDD mode, downlink and uplink transmissions take place in different, sufficiently separated, frequency bands. In TDD mode, on the other hand, downlink and uplink transmission take place in different, non-overlapping time slots. Thus, TDD can operate in unpaired spectrum, whereas FDD requires paired spectrum. TDD mode also allows for different asymmetries in terms of the amount of resources allocated for uplink and downlink transmission, respectively. In this regard, the UL/DL configuration of a TDD cell determines, among other things, the particular allocation of subframes for DL use and for UL use, within a given radio frame. Different UL/DL configurations correspond to different proportions of DL and UL allocations. Accordingly, UL and DL resources can be allocated asymmetrically for a given TDD carrier.

One consideration for operation in the CA context is how to transmit control signaling on the UL from a mobile terminal to the wireless network. Among other things, UL control signaling includes HARQ feedback. As used herein, the term "HARQ feedback" denotes the HARQ-ACK bits transmitted from the mobile terminal for the involved CCs, for a given HARQ feedback window. Here, the term "HARQ feedback window" refers to the overall set or span of DL subframes that is associated with the HARQ feedback being generated, as taken across all serving cells involved in the HARQ feedback generation. Moreover, the term "HARQ-ACK bit" is used to refer to a given HARQ feedback bit, regardless of whether the state of that bit is an ACK value, a NACK value, or a Discontinuous Transmission, DTX, value.

A User Equipment, UE, or other mobile terminal operating in accordance with LTE Rel-8 or Rel-9—i.e., without CA—is configured with only a single downlink CC and uplink CC. The time-frequency resource location of the first Control Channel Element, CCE, used to transmit the Physical Downlink Control Channel, PDCCH, for a particular downlink assignment determines the dynamic resource to be used by the targeted UE for sending corresponding HARQ feedback on a PUCCH, which in this context is referred to as a "Rel-8 PUCCH". No PUCCH collisions occur in the Rel-8 scheme, because all PDCCHs for a given subframe are transmitted by the network using a different first CCE. Therefore, each targeted UE sends HARQ feedback corresponding to its PDCCH reception using different CCE resources in the UL.

HARQ feedback becomes more complicated in the CA context, where the HARQ feedback relates to multiple serving cells or, equivalently, multiple CCs. However, Rel-10 provides a number of defined approaches to sending such feedback. These defined approaches build in some sense on the approach used in Rel-8, but with certain multiplexing and timing provisions to cover the multiple cells/CCs involved in the HARQ feedback. Rel-10 procedures, however, assume that all serving cells in a given CA configuration have the same UL/DL configurations and thus have the same UL/DL subframe allocations.

Rel-11, among other things, adds the flexibility of aggregating carriers having different UL/DL configurations and aggregating carriers having different frequency bands and/or Radio Access Technologies, RATs. Rel-11 thus introduces a number of new HARQ feedback scenarios that are incompatible with the HARQ feedback signaling introduced in Rel-10 for CA scenarios.

SUMMARY

In one aspect, the teachings herein provide a method and apparatus for extending certain HARQ feedback procedures introduced in LTE Rel-10, which are defined for CA configurations involving TDD serving cells of the same UL/DL configuration, to the new, more complex CA configurations introduced in Rel-11 and involving aggregations of interband TDD serving cells with differing UL/DL configurations. Such reuse enables reliable and efficient HARQ feedback signaling in LTE Rel-11, without substantially increasing the specification or implementation complexity of HARQ feedback signaling in LTE Rel-11, despite the decidedly more complex CA configurations introduced in LTE Rel-11.

In one example, a UE implements a method of HARQ feedback generation for transmission in a wireless communication network, where the method advantageously enables the UE to generate the same number of HARQ feedback bits for all serving cells in its CA configuration, even where two or more of the serving cells have differing UL/DL configurations. In this regard, the UE operates according to a defined CA configuration that involves two or more TDD serving cells having different UL/DL configurations. The method includes determining which serving cell from among two or more serving cells has a largest association set size. It will be understood that the UL/DL configurations of the serving cells define the association set for each serving cell as which DL subframes are associated with the HARQ feedback to be generated.

The method includes generating an equal number of HARQ-ACK bits for each serving cell, based on the largest association set size. Such processing includes, for the determined serving cell—i.e., the cell having the largest association set size—generating a HARQ-ACK bit according to an actual HARQ feedback state for each DL subframe that is associated with the determined serving cell. The processing further includes, for each remaining serving cell among the two or more serving cells, generating a HARQ-ACK bit according to an actual HARQ feedback state for each DL subframe that is associated with the remaining serving cell, and generating additional HARQ-ACK bits as DTX or NACK values, as needed, so that the number of HARQ-ACK bits generated for each remaining serving cell equals the number of HARQ-ACK bits generated for the determined serving cell.

Additionally, or alternatively, the UE may be configured to perform another example method, in which it uses the value of a received downlink assignment index to generate an equal number of HARQ-ACK bits for each serving cell in its CA configuration, even where two or more of the serving cells have differing UL/DL configurations. The method includes receiving a downlink assignment index, the value of which indicates the number of DL subframe assignments within the HARQ feedback window, as taken across all serving cells that are associated with the HARQ feedback being generated. The serving cells operate as TDD cells according to their respective UL/DL configurations and are known from a CA configuration for the UE.

The method includes generating an equal number of HARQ-ACK bits for each serving cell, based on the downlink assignment index. Such processing includes, for each serving cell, generating a HARQ-ACK bit based on the actual HARQ feedback state for each DL assignment that is within an association set of DL subframes, as defined for the serving cell by the UL/DL configurations of the serving cells. The processing further includes, for each serving cell, as needed, generating additional HARQ-ACK bits as DTX or NACK bits, so that the number of HARQ-ACK bits generated for the serving cell equals the downlink assignment index.

Of course, those skilled in the art will appreciate that the present invention is not limited to the above contexts or examples, and will recognize additional features and advantages upon reading the following detailed description and upon viewing the accompanying drawings.

BRIEF DESCRIPTION OF THE DRAWINGS

FIG. 6 illustrates Table 1, which is known from 3GPP TS 36.213 and provides association set definitions for a TDD cell operating according respective ones of the various UL/DL configurations illustrated in FIG. 5.

FIGS. 7 and 8 illustrate application of Table 1 from FIG. 6 in terms of the DL subframe associations and feedback timing for HARQ feedback to be observed by a UE with respect to a TDD cell operating according to Configuration #1 and Configuration #2, respectively, from FIG. 5.

FIGS. 9-12 illustrate DL subframe associations and timings for various two-cell carrier aggregation scenarios involving interband aggregations of a primary and secondary cell, wherein the HARQ timing used by the UE for the secondary cell is based on the HARQ timing of the primary cell.

FIG. 15 illustrates Table 2, which, according to the teachings herein, depicts example cases for reusing CA HARQ signaling from LTE Rel-10, for new LTE Rel-11 CA scenarios.

FIG. 16 illustrates Table 3, which is known from 3GPP TS 36.213 and shows the mapping of transport block and serving cell to HARQ-ACK(j) for PUCCH format 1b HARQ-ACK channel selection for TDD with M=1.

FIGS. 17-19 illustrates Tables 4, 5 and 6, respectively, as known from 3GPP TS 36.213 for the transmission of HARQ-ACK multiplexing for A=2 (Table 4), A=3 (Table 5), and A=4 (Table 6).

FIG. 20 illustrates Table 7, as known from 3GPP TS 36.213 for the mapping of subframes on each serving cell to HARQ-ACK(j) for PUCCH format 1b HARQ-ACK channel selection for TDD with M=2.

FIG. 21 illustrates Table 8, as known from 3GPP TS 36.213 for the transmission of HARQ-ACK multiplexing, for M=3.

FIGS. 22A and 22B illustrate Table 9, as known from 3GPP TS 36.213 for the transmission of HARQ-ACK multiplexing, for M=4.

DETAILED DESCRIPTION

Figure 1:
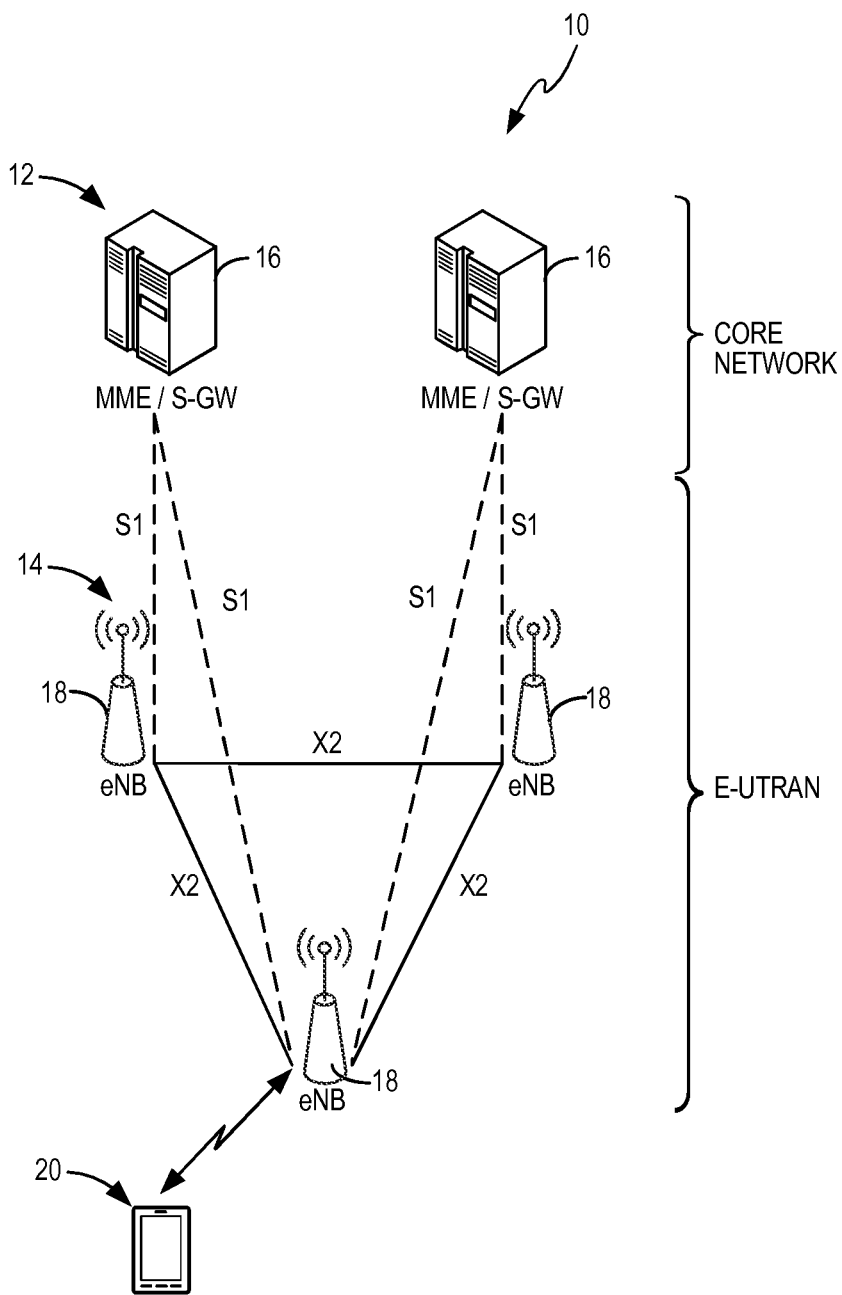
FIG. 1 is a functional block diagram illustrating a Long Term Evolution, LTE, network that is configured according to the teachings herein.

FIG. 1 illustrates a representative example of a modern wireless communication network 10 contemplated for use in one or more embodiments of the teachings presented herein. In particular, the network 10 is depicted according to the LTE standards promulgated by 3GPP. As shown, the network 10 includes a core network 12—an "evolved packet core" in the LTE context—and radio access network 14—which is denoted as an E-UTRAN for the LTE context—i.e., an Evolved Universal Terrestrial Radio Access Network.

The core network 12 comprises a plurality of nodes 16 including those having the functionality of a Mobile Management Entity, MME, and a Signaling Gateway, S-GW. In turn, the radio access network 14 includes a number of base stations 18, referred to as evolved NodeBs, eNodeBs, or simply eNBs in the LTE context. The eNBs 18 communicatively connect to each other over a logical interface referred to as an "X2" interface. Further, the eNBs 18 communicate with the MME/SGWs 16 over a logical interface referred to as the "S1" interface.

The eNBs 18 also communicate with one or more user terminals, as represented by the User Equipment, UE, 20 shown in the diagram. With respect to those communications, each eNB 18 provides or otherwise controls one or more "cells". Multiple cells associated with one eNB 18 may partly or wholly overlap in terms of geographic area. Likewise, cells associated with neighboring eNBs 18 may at least partly overlap at their respective borders. As is well understood in the art, a cell may be understood as the allocation of particular radio resources over a particular geographic area. For example, a given eNB 18 may provide two cells that partially or wholly overlap by using different carriers in the cells, e.g., carriers in different frequency bands or subbands. Unless the distinction is needed for clarity, the term "serving cell" is used interchangeably with "component carrier" or "CC", in the CA context of interest herein.

For further ease of discussion FIG. 1 illustrates only one UE 20. Of course, there may be many UEs 20 supported by the network 10 and, similarly, the network 10 may include additional eNBs 18, MME/SGWs 16, and various other entities not shown, such as for authorization, access control and accounting, operations and maintenance, etc. The term "UE" should be given a broad construction that encompasses essentially any wireless device or apparatus that is configured to operate within the network 10, with mobile terminals such as cellular telephones or other wireless computing devices being non-limiting examples.

The radio access network 14 provides an air interface communicatively linking the UEs 20 and the eNBs 18, where the air interface is defined by specific frequencies, signal type/structure, timing, protocols, etc. In the example case, the air interface follows the LTE specifications. The eNBs 18 provide the UEs 20 with access to the core network 12, and to other systems and networks to which the core network 12 is communicatively coupled.

Figure 2:
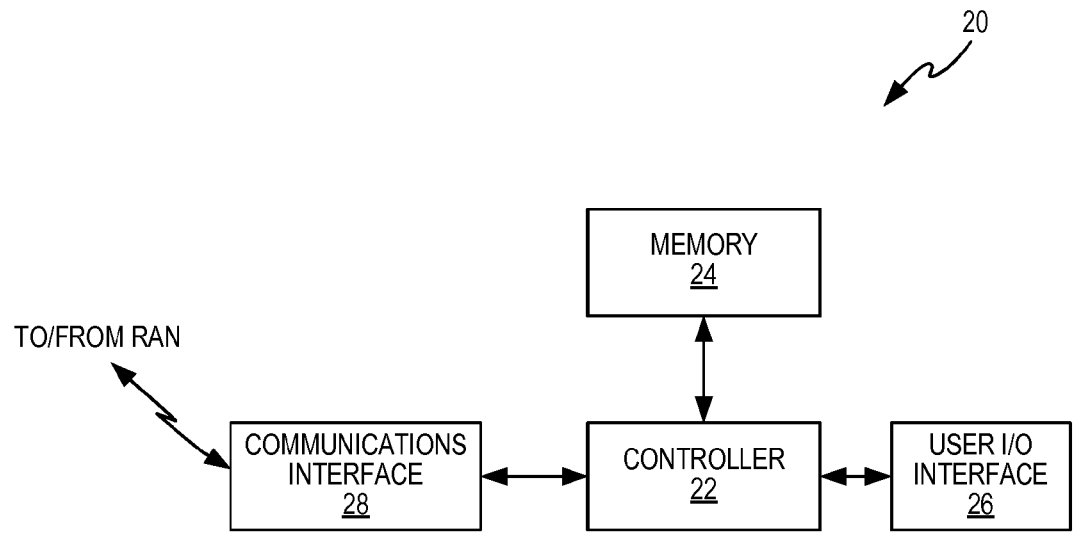
FIG. 2 is a functional block diagram illustrating example components of a User Equipment, UE, that is configured according to the teachings herein.

FIG. 2 provides a functional block diagram illustrating components of an example UE 20 configured to operate according to one or more embodiments of the teachings herein. As seen in the diagram, the example UE 20 comprises a programmable controller 22, a memory 24, a user I/O interface 26, and a communications interface 28. The user I/O interface 26 provides the components necessary for a user to interact with the UE 20 and its details depend on the intended use and features of the UE 20, which are of no particular concern in this discussion.

The communications interface 28 comprises a transceiver—a transmitter and receiver—that supports wireless communication with the wireless communication network 10 via an air interface. That is, the communications interface 28 provides for communications with the eNBs 18 in the network 10 over the appropriate air interface. In one or more embodiments, the air interface is an LTE-based air interface and the communications interface 28 is configured to operate according to the LTE specifications, e.g., according to Rel-11. The memory 24 may comprise any solid-state memory or computer readable media known in the art. Suitable examples of such media include, but are not limited to, ROM, DRAM, FLASH, or a device operable as computer-readable media, such as optical or magnetic media. Of course, working memory such as SRAM also may be included, e.g., in or accessible to the programmable controller 22.

The programmable controller 22, also referred to as a "controller circuit", is implemented by one or more microprocessors, hardware, firmware, or any combination thereof, and generally controls the operation and functions of the UE 20 according to the appropriate standards. Such operations and functions include, but are not limited to, communicating with the eNBs 18 as previously noted. In this regard, the programmable controller 22 may be configured to implement logic and instructions stored in memory 24 to perform the device-side method(s) described herein, or any variations or extensions. In particular, it will be understood that whether configured programmatically via computer program instruction execution or configured via fixed circuitry, the example UE 20 is configured to generate HARQ feedback according to the teachings herein.

According to one example, the UE 20 is configured to generate HARQ feedback for transmission in the network 10. Advantageously, the HARQ feedback generation is performed in a manner that allows the UE 20 to operate with CA configuration wherein two or more of the serving cells have different association set sizes, such as permitted in Rel-11, while reusing certain HARQ feedback procedures established in LTE Release 10 for CA configurations involving serving cells all having the same association set size.

For example details on association sets, one may refer to Table 1 of FIG. 6 herein, which is a reproduction of Table 10.1.3.1-1 in 3GPP TS 36.213 V10.4.0 (2011). Of course, TS 36.213 includes comprehensive details for association sets and background procedures for generating HARQ feedback in the non-CA and CA contexts, which may be of interest to the reader. Here, it is enough to note that the association set for a given serving cell or CC can be understood as defining which DL subframes are associated with the HARQ feedback to be sent a given UL subframe n. Because Rel-11 permits the aggregation of serving cells with different UL/DL configurations, some serving cells in the CA configuration of the UE 20 may have a greater or lesser number of associated DL subframes, which greatly complicates the generation of HARQ feedback.

The controller circuit 22 has an advantageous configuration that addresses such complexities. In on example, the controller circuit 22 is operatively associated with the communications interface 28 and is configured to determine which serving cell from among two or more serving cells has a largest association set size. Here, the serving cells are serving cells according to the CA configuration defined for the UE 20 and they operate as TDD cells according to their respective UL/DL configurations, which define the association set for each serving cell. The size of the association set of any given serving cell may be denoted by the parameter "M".

The controller circuit 22 is further configured to generate the HARQ feedback, e.g., for the given UL subframe n, by, for the determined serving cell, generating a HARQ-ACK bit according to an actual HARQ feedback state for each DL subframe that is associated with the determined serving cell. For each remaining serving cell among the two or more serving cells in the UE's CA configuration, the controller circuit 22 is configured to generate a HARQ-ACK bit according to an actual HARQ feedback state for each DL subframe that is associated with the remaining serving cell, and to generate additional HARQ-ACK bits as DTX or NACK values, as needed, so that the number of HARQ-ACK bits generated for each remaining serving cell equals the number of HARQ-ACK bits generated for the determined serving cell.

This controller configuration generates an equal number of HARQ-ACK bits for each serving cell or CC that is included in the CA configuration of the UE 20, even where different ones of the serving cells have different association set sizes. HARQ feedback generation in this manner provides several advantages, including allowing the UE 20 to reuse HARQ feedback procedures defined in Rel-10 for CA configurations that are based on all serving cells having the same association set size.

In a related embodiment, a computer program comprises instructions stored in the memory 24 or other computer readable medium, which, when executed by the controller circuit 22, configure the UE 20 to generate HARQ feedback for transmission in a wireless communication network 10, based on configuring the UE 20 to determine which serving cell from among two or more serving cells has a largest association set size. As explained, the serving cells are serving cells according to a CA configuration for the UE 20 and operate as TDD cells according to UL/DL configurations that define the association set for each serving cell as which DL subframes are associated with the HARQ feedback.

Execution of the program instructions further configure the controller circuit 22 to generate the HARQ feedback by, for the determined serving cell, generating a HARQ-ACK bit according to an actual HARQ feedback state for each DL subframe that is associated with the determined serving cell, and, for each remaining serving cell among the two or more serving cells, generating a HARQ-ACK bit according to an actual HARQ feedback state for each DL subframe that is associated with the remaining serving cell, and generating additional HARQ-ACK bits as DTX or NACK values, as needed, so that the number of HARQ-ACK bits generated for each remaining serving cell equals the number of HARQ-ACK bits generated for the determined serving cell.

Additionally or alternatively, the controller circuit 22 is configured to: receive a downlink assignment index, DAI. Here, the serving cells are, as before, TDD cells having respective UL/DL configurations and the value of DAI, denoted as $W_{DAI}$, indicates to the UE the number of subframes for which the UE 20 shall potentially provide HARQ feedback for and thus is not a cell-specific value, in contrast to the cell-specific association set sizes of the serving cells. The DAI indicated in the UL grant is single value that is valid across multiple serving cells and may be understood as a parameter that is used by the UE 20 to derive the size of the HARQ feedback window. In that regard, note that the HARQ feedback window spans all of the DL subframes that are associated with the HARQ feedback to be generated, across all of the serving cells in the CA configuration for which the HARQ feedback is to be generated. In contrast, the association set sizes, represented by the M parameters, are cell-specific. That is, each serving cell in the CA configuration has its own specified M parameter, which may or may not equal the downlink assignment index $W_{DAI}$. The downlink assignment may be received in Downlink Control Information, DCI, carrying an UL grant for the UE 20.

The controller circuit 22 in this embodiment is configured to generate the HARQ feedback by generating HARQ-ACK bits for each serving cell equal in number to the downlink assignment index, so that the same number of HARQ-ACK bits is generated for each serving cell. Here, the HARQ-ACK bits generated for each serving cell are based on actual HARQ feedback states for each DL subframe assignment that is within the association set of DL subframes defined for the serving cell, and additional HARQ-ACK bits are generated for each serving cell on an as-needed basis, to make the number of HARQ-ACK bits generated for each serving cell equal to the downlink assignment index. The additional HARQ-ACK bits are generated as DTX or NACK values. It will be appreciated that this example controller circuit configuration may be achieved based on the execution by the controller circuit 22 of computer program instructions stored in the memory 24 or other computer-readable medium.

Figure 3:
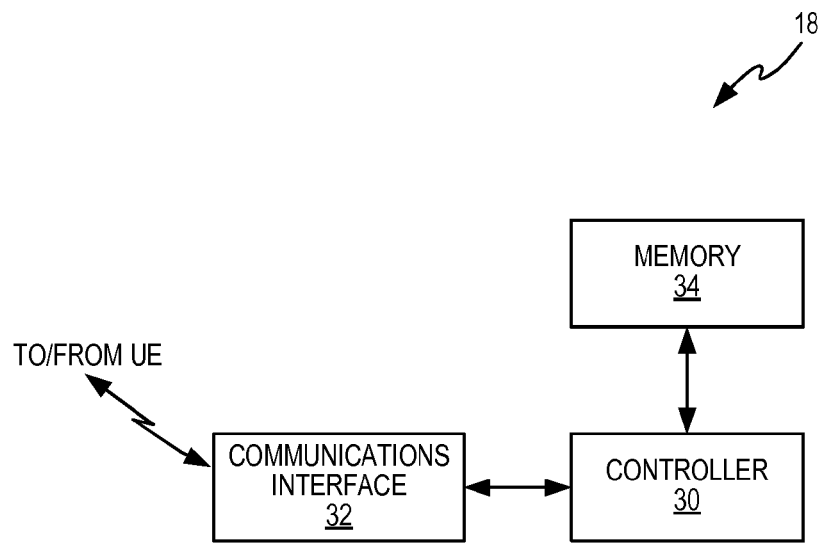
FIG. 3 is a functional block diagram illustrating an eNodeB or eNB that is configured according to the teachings herein.

FIG. 3 illustrates a functional block diagram of an example eNB 18 that is configured to carry out network-side processing according to one or more embodiments taught herein. The example eNB 18 comprises a programmable controller 30, a communications interface 32, and a memory 34. The communications interface 32 may, for example, comprise a transmitter and receiver configured to operate in an LTE system or other similar system. As is known in the art, the transmitter and receiver are coupled to one or more antennas, which are not shown, and communicate with the UE 20 over the LTE-based air interface. Memory 34 may comprise any solid-state memory or computer readable media known in the art. Suitable examples of such media include, but are not limited to, ROM, DRAM, Flash, or a device capable of reading computer-readable media, such as optical or magnetic media.

The programmable controller 30 controls the operation of the eNB 18 in accordance with the LTE standard. The functions of the controller 30 may be implemented by one or more microprocessors, hardware, firmware, or a combination thereof, and include performing the network-side processing described herein. Thus, the controller 30 may be configured, according to logic and instructions stored in memory 34, to communicate with UEs 20, and to perform the network-side aspects of HARQ-feedback related processing as taught herein. In one such example, the eNB 18 knows how a given UE 20 is scheduled and for which UL/DL configurations the UE 20 is configured. Thus, the eNB 18 can configure its receiver resources with respect to the UE 20 so that it searches for the states in the HARQ feedback from the UE 20 that are valid for the UE 20.

As a further advantage, the teachings herein disclose example methods enabling reuse of the LTE Rel-10 signaling tables and associated HARQ-ACK bit mappings and structure, including those defined for Format 1b with channel selection. Broadly, these may be referred to as "HARQ signaling protocols". See the aforementioned TS 36.213 at Sections 10.1 and 10.2. Section 10.1.3.2 in particular defines TDD HARQ-ACK procedures for more than one configured serving cell and includes arrangements for multiplexing HARQ-ACK bits for more than one configured cell in Table 10.1.3.2-1 (Transmission of HARQ-ACK multiplexing for A=2), Table 10.1.3.2-2 (Transmission of HARQ-ACK multiplexing for A=3), and Table 10.1.3.2-3 (Transmission of HARQ-ACK multiplexing for A=4).

Of course, these signaling tables are predicated on all serving cells involved in the HARQ reporting having the same UL/DL configuration. As noted, LTE Rel-11 departs significantly this assumption by allowing for the aggregation of CCs having different UL/DL configuration. As a consequence, the M parameter is not necessarily equal across the CCs included in a given CA configuration and the Rel-10 HARQ signaling protocols are, as presented in the standard, inapplicable. Thus, one might be intuitively led to defining a new HARQ signaling protocol for Rel-11. Advantageously, however, the teachings herein disclose HARQ-ACK bit generation and processing methods that enable reuse of the Rel-10 HARQ signaling protocols. The teachings herein thus enable reliable and efficient HARQ-ACK feedback for LTE Rel-11 interband TDD CA without substantial increase in specification and implementation complexity.

Figure 4:
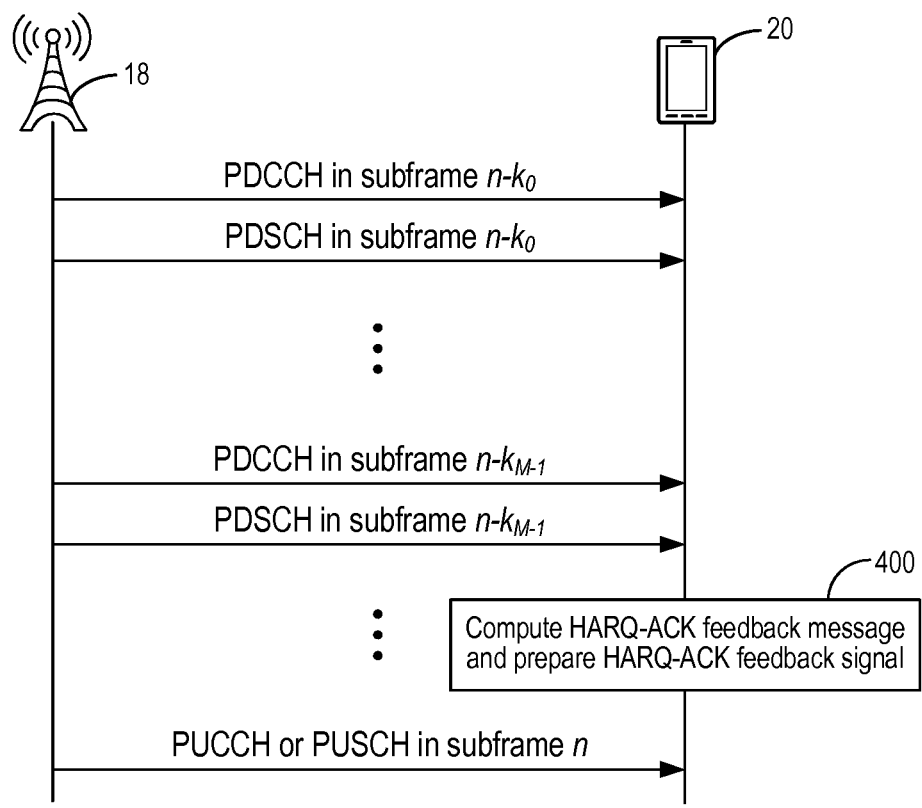
FIG. 4 is a signaling diagram illustrating a HARQ feedback signaling procedure according to one or more embodiments of HARQ feedback generation taught herein.

FIG. 4 illustrates an example context for the innovative device-side HARQ feedback processing taught herein, wherein a UE 20 performs HARQ feedback generation according to a method 400 that is detailed later herein. To better understand the signaling flow context of FIG. 4, consider that LTE-based UEs 20 use HARQ to report whether decoding was successful (ACK) or unsuccessful (NACK) for DL subframe transmissions—PDSCH transmissions—from an eNB 18 to the UE 20. In case of an unsuccessful decoding attempt, the eNB 18 can retransmit the erroneous data.

In a subframe where the UE 20 has an UL grant for a Physical Uplink Shared Channel, PUSCH, transmission, the UE 20 incorporates the HARQ feedback message into the PUSCH transmission. If the UE 20 has not been assigned an uplink resource for PUSCH transmission in a subframe, the UE 20 uses a PUCCH to send the HARQ feedback message. In the specified TDD context, the HARQ feedback timing depend on the UL/DL configuration of the cell originating the PDSCH transmission(s).

Figure 5:
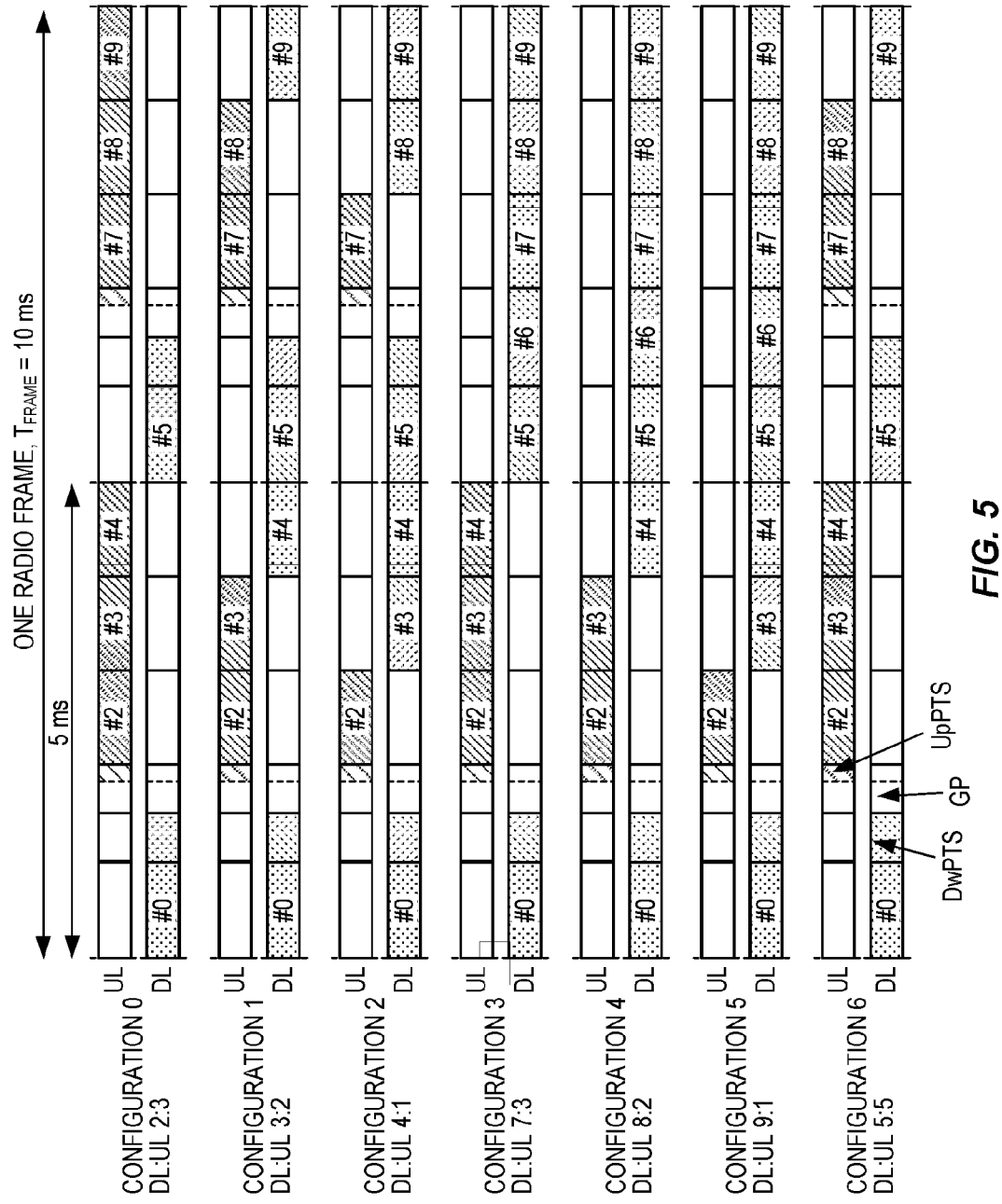
FIG. 5 illustrates UL/DL configurations for TDD operation of a cell in a LTE network, as are known from LTE Rel-10.

To better understand the timing arrangements, consider FIG. 5, which depicts seven defined UL/DL configurations for TDD operation of a cell in an LTE network. The LTE radio frame is ten milliseconds. Each frame includes ten subframes of one millisecond each. While not detailed in the diagram, those skilled in the art will appreciate that each subframe includes two slots of one-half millisecond each, and that each slot spans six or seven Orthogonal Frequency Division Multiplexing, OFDM, symbol times, depending on whether normal Cyclic Prefix, CP, or extended CP is being used. Also in the diagram, one sees that each UL/DL configuration defines a certain allocation of subframes to DL use and to UL use, and includes "special" subframes having an abbreviated DL part—DwPTS—and an abbreviated UL part—UpPTS. A guard portion or GP separates the DL and UL parts of a special subframe.

LTE Rel-8 specifies that a UE shall provide HARQ feedback for PDSCH decoding in an UL subframe having a predefined position relative to the DL subframes for which the HARQ feedback is being generated. In particular, the UE shall transmit such HARQ feedback on the PUCCH in UL subframe n if there is a PDSCH transmission indicated by the detection of a corresponding Physical Downlink Control Channel, PDCCH, or there is a PDCCH indicating downlink Semi-Persistent Scheduling, SPS, release within subframe(s) n–k, where k is within a so-called association set $K=\{k_0, k_1, \ldots, k_{m-1}\}$. The association set can be understood as defining the DL subframes that are associated with the HARQ feedback being generated for transmission at UL subframe n and in that sense the associated set of DL subframes defines the HARQ feedback window. Table 1 as shown in FIG. 6 illustrates the association sets as specified in TS 36.213 for the different UL/DL configurations shown in FIG. 5 and is a reproduction of Table 10.1.3.1-1 in TS 36.213.

The size of the association set K is denoted by M. In Rel-10, the parameter M is used to determine the PUCCH resources and signaling. The parameter M may take on different values in different subframes and in cells of different UL/DL configurations. However, as noted, for the CA context, Rel-10 assumes that all aggregated serving cells have the same UL/DL configuration. As a consequence, the M parameters are identical across all CCs configured as serving cells for a UE in Rel-10, for any given subframe.

To better understand the DL subframe association sets, consider that Table 1 illustrates $K=\{7, 6\}$ for UL subframe 7 according to Configuration #1. That corresponds to carrying possible HARQ feedbacks for PDSCHs transmitted to the UE in subframes 7−7=0 and 7−6=1. This arrangement is illustrated in FIG. 7, which shows two consecutive LTE frames of ten subframes each, where the subframes in each frame are indexed from 0 to 9. One sees for UL/DL Configuration #1 arrows pointing from DL subframes 0 and 1 to the UL subframe 7, indicating that the HARQ feedback sent in UL subframe 7 will be for DL subframes 0 and 1. For UL subframe 7 in FIG. 7, then, the HARQ feedback window spans the two DL subframes 0 and 1 that are associated with UL subframe 7 according to the association set defined for it. It will be understood that M=2 in this case, i.e., that the association set size is two for UL subframe 7 in the first illustrated frame, denoted as "FRAME i" in the diagram. Also note that in the diagram, "D" indicates DL subframes, U indicates UL subframes, and S indicates special subframes.

In a similar example, FIG. 8 illustrates that, according to Configuration #2, the UL subframe 2 in the second frame, FRAME i+1, has an association set defined by $K=\{8, 7, 4, 6\}$, which corresponds to carrying possible HARQ feedback for PDSCHs transmitted in subframes 4, 5, 6, and 8 of the preceding frame, FRAME i. This arrangement is illustrated as arrows from the associated DL subframes to the UL subframe 2. Correspondingly, it will be understood that M=4 for the UL subframe 2 in FRAME i+1, i.e., its association set size equals four and its HARQ feedback window includes all of the associated DL subframes.

FIGS. 9-12 illustrate example HARQ timing for multiple cells in cases where a UE is configured with different UL/DL configurations for the different cells. In particular, these figures illustrate that the timing may differ between different cells and that the HARQ feedback size per CC is different as well. For example, FIG. 9 illustrates the association set mappings for sending HARQ feedback from a UE operating with two CCs aggregated together, where the Primary CC, PCC, operates with UL/DL Configuration #2 and the secondary CC, SCC, operates with UL/DL Configuration #1. The PUSCH HARQ timing of the PCC is applied to the SCC, although the SCC operates with Configuration #1 and the PCC operates with Configuration #2.

FIG. 10 shows the opposite case, where the PCC operates according to Configuration #1 and the SCC operates according to Configuration #2. In this case, the PUSCH HARQ timing defined by Configuration #1 of the PCC is applied to the SCC. In a similar fashion, FIG. 11 depicts the two-CC case, where the Configuration #1 timing of the PCC is applied to an SCC having Configuration #3. Finally, FIG. 12 illustrates the application of Configuration #3 timing from the PCC, to an SCC having Configuration #1.

Figure 13:
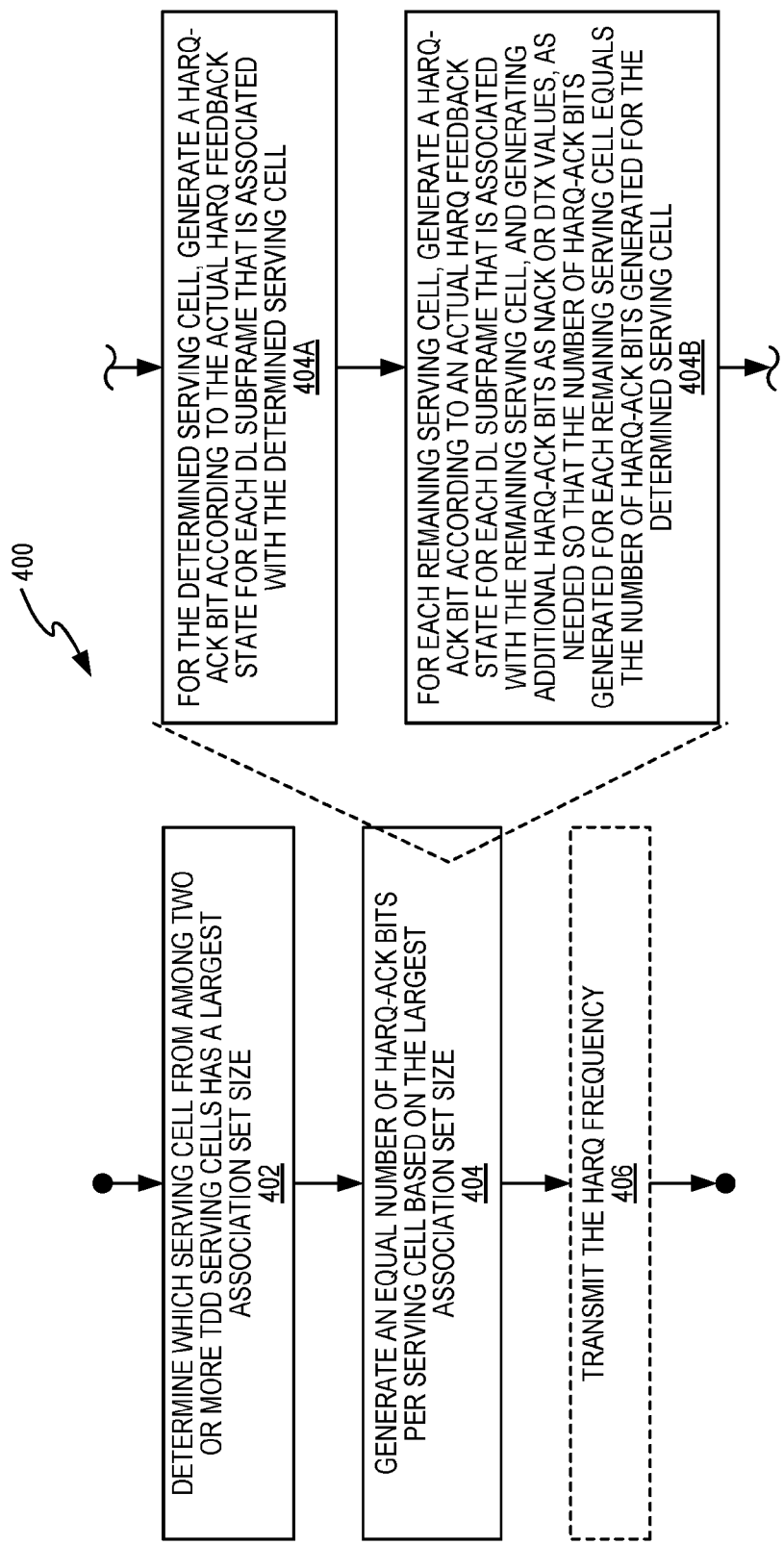
FIGS. 13 and 14 are logic flow diagrams of example embodiments of methods taught herein for generating an equal number of HARQ-ACK bits per serving cell, in CA scenarios involving the aggregation of serving cells having differing UL/DL configurations.
Figure 14:
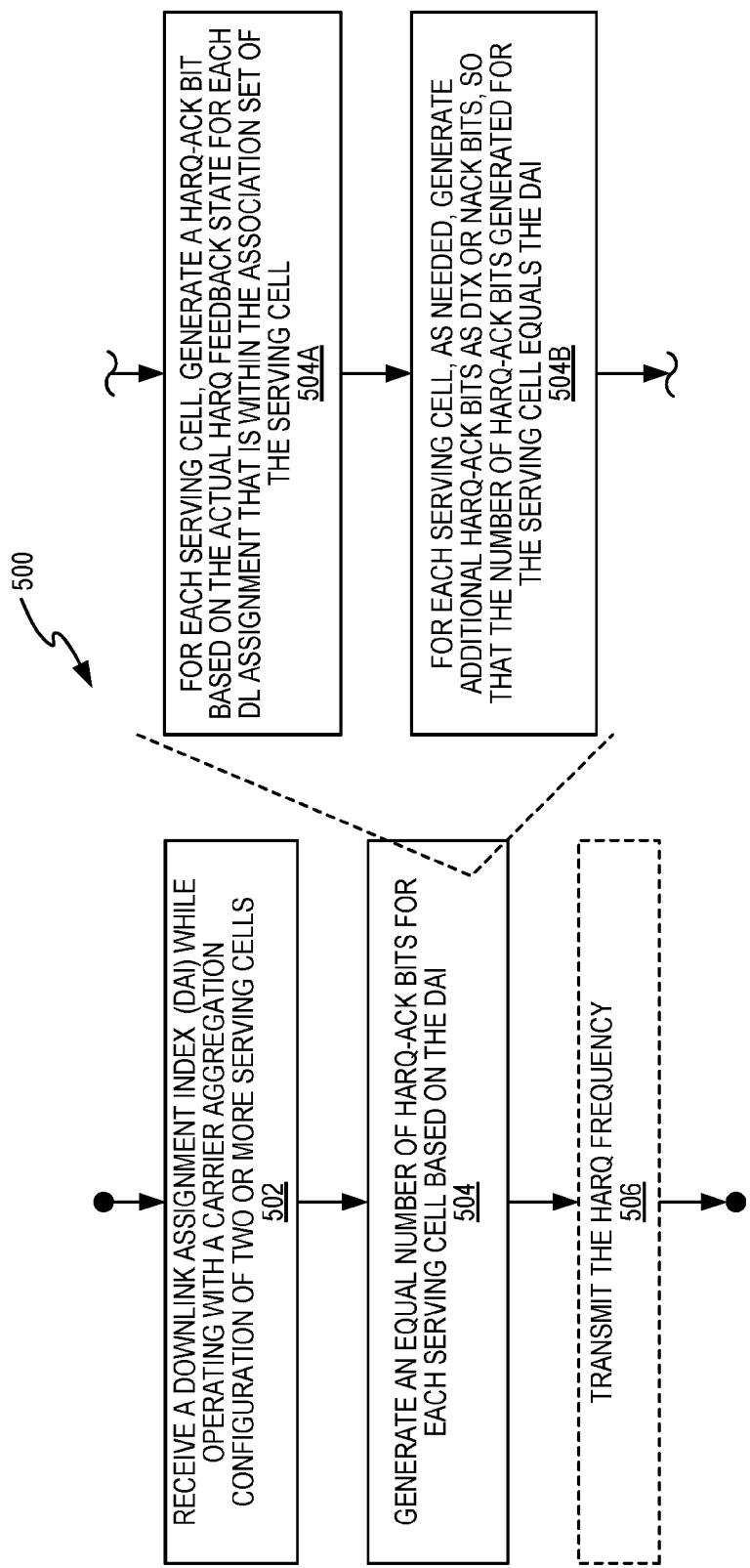

With these examples in mind, consider an example elaboration of the method 400 introduced in FIG. 4, such as shown in FIG. 13. The UE 20 performs the method 400 for HARQ, feedback transmission in a wireless communication network, such as the example network 10. In the context of method 400, one may assume that the UE 20 has a CA configuration involving two or more serving cells having different UL/DL configurations that give rise to different M parameter values for two or more of the serving cells to be reported on by the UE 20 in the HARQ feedback.

The method 400 includes determining (Block 402) which serving cell from among two or more serving cells has a largest association set size (i.e., the largest M parameter), wherein the serving cells are serving cells according to the CA configuration defined for the UE 20. The CA configuration may be established using RRC signaling and the serving cells in question are TDD cells operating according to their respective UL/DL configurations. These UL/DL configurations define the association set for each serving cell, as which DL subframes are associated with the HARQ feedback. Again, see FIGS. 9-12 for various two-carrier aggregations, where the SCC takes its HARQ timing from the UL/DL configuration of the PCC.

The method 400 continues with generating (Block 404) an equal number of HARQ-ACK bits per serving cell, based on the largest association set size among the association sets of the serving cells. In more detail, for the determined serving cell, the HARQ feedback is generated (Block 404A) by generating a HARQ-ACK bit according to an actual HARQ feedback state for each DL subframe that is associated with the determined serving cell. For each remaining serving cell, the method 400 includes generating (Block 404B) generating a HARQ-ACK bit according to an actual HARQ feedback state for each DL subframe that is associated with the remaining serving cell, and generating additional HARQ-ACK bits as DTX or NACK values, as needed, so that the number of HARQ-ACK bits generated for each remaining serving cell equals the number of HARQ-ACK bits generated for the determined serving cell. While this description refers to "all" and "each" serving cell of the UE 20, it will be understood that such terms here and elsewhere in this disclosure refer to those serving cells for which the UE 20 is expected to report HARQ feedback, which may be only those serving cells in the CA configuration that are "active" with respect to the UE 20.

The method 400 presents an advantageous example HARQ feedback generation rule that forces the number of HARQ-ACK bits to be the same for each serving cell in a given CA configuration, even where different ones of the serving cells have different M parameters. The method 400 further includes transmitting (Block 406) the HARQ feedback, thus generated. The HARQ feedback transmission may be a PUCCH transmission, e.g., a PUCCH format 1b transmission. Alternatively, the HARQ feedback may be included in a PUSCH transmission multiplexed with UL Shared Channel, U-SCH, information, or multiplexed with Channel State Information, CSI.

Advantageously, the method 400 provides for transmitting the HARQ feedback using a PUCCH resource selection reserved for use in cases where all configured serving cells use the same UL/DL configuration, even when the method 400 is performed in the context of CA configurations involving two or more serving cells having different UL/DL configurations. For example, using the PUCCH resource selection predefined for use in cases where all configured serving cells use the same UL/DL configuration comprises reusing a resource allocation table as defined in Rel-10 of the LTE standard for a DL subframe associated size of M=x, where x equals the size of the association set for the determined serving cell. Such reuse refers, for example, to Tables 10.1.3.2-4, 10.1.3.2-5 and 10.1.3.2-6 in Section 10 of TS 36.213. Broadly, one or more embodiments of the method 400 include multiplexing the HARQ feedback for the two or more serving cells having different M parameters, using a HARQ feedback multiplexing procedure from Rel-10, in which all serving cells have the same M parameter.

The method 400 may include transmitting a semi-persistent scheduling (SPS) release response within a same HARQ feedback window applicable to the HARQ feedback. Such transmission is based, for example, on mapping the SPS release response to one of the HARQ-ACK bits generated for the serving cell associated with the SPS release.

Additionally, or alternatively, the controller circuit 22 may be configured to carry out HARQ feedback generation according to the example method 500 shown in FIG. 15. Such processing was introduced in the context of the FIG. 2 discussion earlier herein, in the context of example configurations and processing for the controller circuit 22. Here, the controller circuit 22 generates an equal number of HARQ-ACK bits for each of its serving cells in a CA configuration, even where those serving cell have different M parameters. However, rather than determining the number of HARQ-ACK bits to generate per serving cell based on the largest association set size, here the controller circuit 22 uses the downlink assignment index, W DAI, to generate an equal number of HARQ-ACK bits for each serving cell.

The method 500 includes receiving (Block 502) a downlink assignment index that indicates the number of DL subframe assignments within the HARQ feedback window, which is taken across all serving cells in the CA configuration of the UE 20 for which the HARQ feedback is to be generated. The downlink assignment index is received, e.g., in DCI carrying an UL grant for the UE 20 and its value indicates the number of DL assignments for the UE 20 across all the serving cells in its CA configuration.

The method continues with generating an equal number of HARQ-ACK bits for each serving cell based on the downlink assignment index (Block 504), and transmitting the generated HARQ feedback (Block 406). As for the processing in Block 504, the illustration depicts an example configuration where the controller circuit 22 of the UE 20 generates the HARQ feedback by: for each serving cell, generating (Block 504A) a HARQ-ACK bit based on the actual HARQ feedback state for each DL assignment that is within an association set of DL subframes defined for the serving cell by the UL/DL configurations of the serving cells; and for each serving cell, as needed, generating (Block 504B) additional HARQ-ACK bits as DTX or NACK bits, so that the number of HARQ-ACK bits generated for the serving cell equals the downlink assignment index.

Regarding the HARQ feedback protocol reuse features provided by the teachings herein, consider Table 2 in FIG. 15. One sees a first portion corresponding to known Rel-10 cases involving two serving cells in a CA configuration having the same value of M parameters. Here, the serving cell associated with the PCC is referred to as the Primary Cell or PCell and its M parameter is denoted $M_{PCell}$. Correspondingly, the serving cell associated with the SCC is referred to as the Secondary Cell or SCell and its M parameter is denoted $M_{SCell}$. The Rel-10 cases apply for M=1 through M=4, where $M_{PCell}$ and $M_{SCell}$ are equal. New cases are defined for multiple scenarios, broken out as new groups 1, 2, 3 and 4, all involving different values of M for the PCell and the SCell.

Consider "group 3" from Table 2, for example. This group corresponds to the selection of PUCCH resources from "A"

PUCCH resources for HARQ feedback transmission, where A=4 PUCCH resources. The interested reader may refer to Section 10.1.3.2.1 of TS 36.213 for details on the related Rel-10 PUCCH format 1b with channel selection HARQ-ACK procedure, and Table 10.1.3.2-3 within that section, highlighting transmission of HARQ-ACK multiplexing for the A=4 case.

For a subframe n, define $M_{map}=\max(M_{PCell}, M_{SCell})$. That is, $M_{map}$ gives the larger value between the M parameters of the PCell and the SCell, meaning that $M_{map}$ is the value of the M parameter for the serving cell determined to have the largest association set size. The method 400 can be considered as including the following processing rules for generating the HARQ-ACK bits in this scenario, including the following:

If $M_{map}=1$:

Reserve HARQ-ACK bits for the two serving cells according to Table 3 as shown in FIG. 16, where Table 3 defines the mapping of transport block and serving cell to HARQ-ACK(j) for PUCCH format 1b HARQ-ACK channel selection for TDD with M=1.

If $M_{PCell}=0$, assign DTX to HARQ-ACK bits for the PCell so that HARQ-ACK(j)=DTX or NACK where $M_{PCell} \le j < M_{map}$.

If $M_{SCell}=0$, assign DTX to HARQ-ACK bits for the Scell so that HARQ-ACK(j)=DTX or NACK where $M_{SCell} \le j < M_{map}$.

The UE shall transmit b(0)b(1) on PUCCH resource $n_{PUCCH}^{(1)}$ selected from A PUCCH resources, $n_{PUCCH,j}^{(1)}$ where $0 \le j \le A-1$ and $A \in \{2, 3, 4\}$, according to Table 4, Table 5 and Table 6 in subframe n using PUCCH format 1b—where the relevant tables are shown in FIGS. 17, 18 and 19, respectively. Table 4 relates to HARQ-ACK multiplexing for A=2, Table 5 corresponds to A=3, and Table 6 corresponds to A=4.

Here, A can be determined in different ways. According to the first example, A is given by Table 3, in a second example A is given by maximum number of configured transport blocks on either of the two component carrier times two, in a third example spatial HARQ-ACK bundling across multiple codewords within a DL subframe is performed by a logical AND operation of all the corresponding individual HARQ-ACKs, so that at maximum one HARQ-ACK bit per CC is fed back.

If $M_{map}=2$:

Reserve HARQ-ACK bits for the two serving cells according to Table 7 shown in FIG. 20, where Table 7 relates to mapping of subframes on each serving cell to HARQ-ACK(j) for PUCCH format 1b HARQ-ACK channel selection for TDD with M=2.

If $M_{PCell}<M_{map}$, assign DTX to HARQ-ACK bits for the PCell so that HARQ-ACK(j)=DTX or NACK where $M_{PCell} \le j < M_{map}$.

If $M_{SCell}<M_{map}$, assign DTX to HARQ-ACK bits for the SCell so that HARQ-ACK(j)=DTX or NACK where $M_{SCell} \le j < M_{map}$.

The UE shall transmit b(0)b(1) on PUCCH resource $n_{PUCCH}^{(1)}$ selected from A PUCCH resources, $n_{PUCCH,j}^{(1)}$ where $0 \le j \le 3$ according to Table 6 in subframe n using PUCCH format 1b.

If $M_{map}=3$:

Reserve M=3 HARQ-ACK bits per serving cell according to Table 8 in FIG. 21, which specifies transmission of HARQ-ACK multiplexing for M=3.

If $M_{PCell}<M_{map}$, assign DTX to HARQ-ACK bits for the PCell so that HARQ-ACK(j)=DTX or NACK where $M_{PCell} \le j < M_{map}$.

If $M_{SCell}<M_{map}$, assign DTX to HARQ-ACK bits for the SCell so that HARQ-ACK(j)=DTX or NACK where $M_{SCell} \le j < M_{map}$.

The UE shall transmit b(0)b(1) on PUCCH resource $n_{PUCCH}^{(1)}$ selected from A PUCCH resources, $n_{PUCCH,j}^{(1)}$ where $0 \le j \le 3$ according to Table 8 in subframe n using PUCCH format 1b.

If $M_{map}=4$:

Reserve M=3 HARQ-ACK bits per serving cell according to Table 9 in FIGS. 22A and 22B, for transmission of HARQ-ACK multiplexing for M=4.

If $M_{PCell}<M_{map}$, assign DTX to HARQ-ACK bits for the PCell so that HARQ-ACK(j)=DTX or NACK where $M_{PCell} \le j < M_{map}$.

If $M_{SCell}<M_{map}$, assign DTX to HARQ-ACK bits for the SCell so that HARQ-ACK(j)=DTX or NACK where $M_{SCell} \le j < M_{map}$.

The UE shall transmit b(0)b(1) on PUCCH resource $n_{PUCCH}^{(1)}$ selected from A PUCCH resources, $n_{PUCCH,j}^{(1)}$ where $0 \le j \le 3$ according to Table 9 in subframe n using PUCCH format 1b.

For any of the above cases if an SPS release response is to be transmitted within the same HARQ-ACK feedback window, it is mapped to HARQ-ACK(0) for the respective serving cell.

In another embodiment, the HARQ-ACK feedback is fed back on PUSCH, multiplexed either with UL-SCH or Channel State Information, CSI, feedback. In one example case, the PUSCH transmission is a PHICH or SPS transmission, or the PUSCH transmission occurs on an UL cell that uses UL/DL Configuration #0 as the actual or reference configuration. In another example case, the PUSCH transmission is based on an UL grant to the UE 20 and the UL/DL Configuration #0 is not used.

The overall number of generated HARQ-ACK bits can be as described above, including the generation of HARQ-ACK bits corresponding to actual HARQ feedback states and as NACK or DTX bits, as needed, according to the "RM Code Input Bits" column in Tables 8 and 9. The bits for the HARQ feedback are encoded with a leaner error correction, as for example a Reed Muller code.

In one embodiment, the UE 20 selects the channel selection mapping table corresponding to $M=\max(M_{PCell}, M_{SCell})$ and the HARQ-ACK bits that do not correspond to any DL subframe are set to DTX or NACK.

When the UE 20 is configured with PUCCH format 1b with channel selection and is transmitting on a PUSCH not in accordance with an UL grant, the UE 20 follows the Rel-10 CA PUSCH procedure defining the number of HARQ-ACK bits to generate. See, e.g., Section 7.3 of TS 36.213 V10.6 or later, and Tables 10.1.3.2-5 and 10.1.3.2-6 in Section 10 of the same document.

In cases where the PUSCH transmission is based on an UL grant and the downlink assignment index $W_{DAI}=1$ or 2, the UE 20 follows the procedure for PUCCH format 3 for scheduled transmissions on the PUSCH, according to the Rel-10 specification detailed in Section 7.3 of TS 36.213 V10.6 or later. In cases where the PUSCH transmission is based on an UL grant and the downlink assignment index $W_{DAI}=3$ or 4, the UE selects either M=3 or M=4 channel selection table based on whether $W_{DAI}=3$ or $W_{DAI}=4$, following the procedure in Rel-10—see the example Tables 10.1.3-3 and 10.1.3-4 in Section 10.1.3.1 of 3GPP TS 36.213 V10.4.0 (2011).

In cases where the HARQ-ACK bits are multiplexed on PUSCH and the PUSCH transmission is not based on an UL grant, the UE generates the number of HARQ-ACK bits according the PUCCH design set forth in Section 7.3 of TS 36.213 V10.6 or later.

In cases where the HARQ-ACK bits are multiplexed on PUSCH and the PUSCH transmission is based on an UL grant and the downlink assignment index $W_{DAI}=1$ or 2, the UE 20 follows the procedure for PUCCH format 3.

In cases where the HARQ-ACK bits are multiplexed on PUSCH and the PUSCH transmission is based on an UL grant and $W_{DAI}=3$ or 4, the UE 20 selects either channel selection table M=3 or M=4 to generate HARQ feedback for both DL cells based on if $W_{DAI}=3$ or $W_{DAI}=4$.

The above detailed rules or protocols address the complexities that arise when sending HARQ feedback from a UE 20 that has a CA configuration that aggregates two or more CCs having different UL/DL configurations. It can be observed from FIGS. 9-12 that the UE would generate a cell specific $M_c$ per cell and occasion in time. Broadly, it will be appreciated from the foregoing examples that, in one or more embodiments taught herein, a UE 20 is configured to generate $M_c$ number of HARQ-ACK bits per DL cell for a PUCCH format 3 transmission or PUSCH transmission that is not based on an UL grant.

In another embodiment, the UE 20 is configured to generate min($W_{DAI}$, $M_c$) number of HARQ-ACK bits per DL cell in case the PUSCH transmission is based on an UL grant.

In the same or other embodiments, the UE is configured to select the channel selection mapping table corresponding to M=max($M_0$, $M_1$) and the HARQ-ACK bits that do not correspond to any DL subframe are set to DTX or NACK. In the forgoing, $M_0$ is the number of DL subframes for which HARQ feedback should be generated for the first cell and $M_1$ is the number of DL subframes for which HARQ feedback should be generated for the second cell.

In another example configuration or configurations, in cases where the HARQ-ACK bits are multiplexed on PUSCH and the PUSCH transmission is not based on an UL grant, the UE 20 may be configured to generate the number of HARQ-ACK bits according PUCCH design.

For cases where the HARQ-ACK bits are multiplexed on PUSCH and the PUSCH transmission is based on an UL grant and the downlink assignment index $W_{DAI}=1$ or 2, the UE 20 may be configured to follow the procedure in Section 7.3 of TS 36.213 V10.6 or later for PUCCH format 3, using M=max($M_1$, $M_1$).

Finally, for cases where the HARQ-ACK bits are multiplexed on PUSCH and the PUSCH transmission is based on an UL grant and $W_{DAI}=3$ or 4, the UE 20 may be configured to select either channel selection table M=3 or M=4 to generate HARQ feedback for both DL cells based on whether the downlink assignment index $W_{DAI}=3$ or $W_{DAI}=4$.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at a User Equipment (UE) of generating Hybrid Automatic Repeat reQuest (HARQ) feedback for transmission in a wireless communication network in an uplink (UL) subframe n, wherein the UE is configured with two or more serving cells according to a carrier aggregation configuration, and wherein the UE is further configured with Time Division Duplex (TDD) Uplink/Downlink (UL/DL) configurations that define the association set for each serving cell as which DL subframes are associated with the HARQ feedback being generated for transmission at a given UL subframe, said method comprising:

determining the largest association set size M among the two or more serving cells for the UL subframe n; and
generating the HARQ feedback by:
generating, for each of the serving cells, a HARQ-ACK bit according to an actual HARQ feedback state for each DL subframe that is associated with the serving cell for the UL subframe n; and
for the serving cells having an association set size smaller than M, generating additional HARQ-ACK bits as Discontinuous Transmission (DTX) values, as needed, so that the number of HARQ-ACK bits generated for each serving cell equals M; and
transmitting the HARQ feedback in the UL subframe n.

2. The method of claim 1, further comprising transmitting the HARQ feedback in a Physical Uplink Shared Channel (PUSCH) transmission.

3. The method of claim 2, further comprising transmitting the HARQ feedback in the PUSCH transmission multiplexed with UL Shared Channel (U-SCH) information or multiplexed with Channel State Information (CSI).

4. The method of claim 1, further comprising transmitting the HARQ feedback using a Physical Uplink Control Channel (PUCCH) resource selection reserved for use in cases where all configured serving cells use the same UL/DL configuration.

5. The method of claim 4, wherein using the reserved PUCCH resource selection comprises reusing a resource allocation table as defined in Release10 (Rel-10) of the LTE standard for M=x, where x equals the size of the association set for the determined serving cell.

6. The method of claim 1, further comprising multiplexing the HARQ feedback for the two or more serving cells according to a multiplexing arrangement specified in a HARQ feedback multiplexing table that assumes that all of the serving cells have the same association set size.

7. The method of claim 1, further comprising transmitting a semi-persistent scheduling (SPS) release response within a same HARQ feedback window applicable to the HARQ feedback, based on mapping the SPS release response to one of the HARQ-ACK bits generated for the serving cell associated with the SPS release.

8. The method of claim 1, wherein the UE is configured with two serving cells.

9. The method of claim 1, wherein the UE is configured with different UL/DL configurations for the different cells.

10. A User Equipment (UE) configured to generate Hybrid Automatic Repeat reQuest (HARQ) feedback for transmission in a wireless communication network in an uplink (UL) subframe n, wherein the UE is configurable with two or more serving cells according to a carrier aggregation configuration, and wherein the UE is further configurable with Time Division Duplex (TDD) Uplink/Downlink (UL/DL) configurations that define the association set for each serving cell as which DL subframes are associated with the HARQ feedback being generated for transmission at a given UL subframe, said UE comprising:

processing circuitry and a memory, said memory containing instructions executable by said processing circuitry whereby said processing circuitry is operative to determine the largest association set size M among the two or more serving cells for the UL subframe n; and generate the HARQ feedback by:

generating, for each of the serving cells, a HARQ-ACK bit according to an actual HARQ feedback state for each DL subframe that is associated with the serving cell for the UL subframe n; and for the serving cells having an association set size smaller than M, generating additional HARQ-ACK bits as Discontinuous Transmission (DTX) values, as needed, so that the number of HARQ-ACK bits generated for each serving cell equals M; and transmit the HARQ feedback in the UL subframe n.

11. The UE of claim 10, wherein the wireless communication network is a Long Term Evolution (LTE) network and wherein said processing circuitry is further operative to configure the UE for operation in the LTE network.

12. The UE of claim 10, further comprising transmitting the HARQ feedback in a Physical Uplink Shared Channel (PUSCH) transmission.

13. The UE of claim 12, wherein said processing circuitry is operative to transmit the HARQ feedback in the PUSCH transmission multiplexed with UL Shared Channel (U-SCH) information or multiplexed with Channel State Information (CSI).

14. The UE of claim 10, wherein said processing circuitry is operative to transmit the HARQ feedback using a Physical Uplink Control Channel (PUCCH) resource selection reserved for use in cases where all configured serving cells use the same UL/DL configuration.

15. The UE of claim 14, wherein said processing circuitry is operative to use the reserved PUCCH resource selection by reusing a resource allocation table as defined in Release10 (Rel-10) of the LTE standard for M=x, where x equals the size of the association set for the determined serving cell.

16. The UE of claim 10, wherein said processing circuitry is operative to multiplex the HARQ feedback for the two or more serving cells according to a multiplexing arrangement specified in a HARQ feedback multiplexing table that assumes that all of the serving cells have the same association set size.

17. The UE of claim 10, wherein said processing circuitry is further operative to transmit a semi-persistent scheduling (SPS) release response within a same HARQ feedback window applicable to the HARQ feedback, based on mapping the SPS release response to one of the HARQ-ACK bits generated for the serving cell associated with the SPS release.

18. The UE of claim 10, wherein the UE is configured with two serving cells.

19. The UE of claim 10, wherein the UE is configured with different UL/DL configurations for the different cells.

* * * * *

UNITED STATES PATENT AND TRADEMARK OFFICE
CERTIFICATE OF CORRECTION

PATENT NO.       : 9,716,571 B2
APPLICATION NO.  : 14/823238
DATED            : July 25, 2017
INVENTOR(S)      : Larsson et al.

It is certified that error appears in the above-identified patent and that said Letters Patent is hereby corrected as shown below:

In the Specification

In Column 1, Line 8, delete "2013," and insert -- 2013, now Pat. No. 9,137,787, --, therefor.

In Column 4, Line 49, delete "illustrates" and insert -- illustrate --, therefor.

In Column 9, Line 62, delete "$k_{m-1}$}." and insert -- $k_{M-1}$}. --, therefor.

In Column 12, Line 26, delete "W DAI," and insert -- $W_{DAI}$, --, therefor.

In Column 13, Line 24, delete "$M_{Pcell}$" and insert -- $M_{PCell}$ --, therefor.

In Column 13, Line 53, delete "$M_{Pcell}$" and insert -- $M_{PCell}$ --, therefor.

In Column 13, Line 67, delete "$M_{Pcell}$" and insert -- $M_{PCell}$ --, therefor.

In Column 14, Line 15, delete "$M_{Pcell}$" and insert -- $M_{PCell}$ --, therefor.

In Column 15, Line 46, delete "$M=\max(M_1, M_1)$." and insert -- $M=\max(M_0, M_1)$. --, therefor.

In the Claims

In Column 16, Line 67, in Claim 10, delete "operative to" and insert -- operative to: --, therefor.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*